US006809679B2

(12) United States Patent
LaFrey et al.

(10) Patent No.: US 6,809,679 B2
(45) Date of Patent: Oct. 26, 2004

(54) SURVEILLANCE SYSTEM AND METHOD FOR AIRCRAFT APPROACH AND LANDING

(75) Inventors: Raymond R. LaFrey, Westford, MA (US); Jeffrey L. Gertz, Marblehead, MA (US); William H. Harman, III, Westford, MA (US); M. Loren Wood, Jr., Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/235,081

(22) Filed: Sep. 5, 2002

(65) Prior Publication Data

US 2004/0046687 A1 Mar. 11, 2004

(51) Int. Cl.[7] ................................................ G01S 13/00
(52) U.S. Cl. ........................................... 342/37; 342/39
(58) Field of Search ............................. 342/32, 33, 34, 342/35, 36, 37, 39, 43, 29, 30

(56) References Cited

U.S. PATENT DOCUMENTS

| | | | | | |
|---|---|---|---|---|---|
| 2,966,675 | A | * | 12/1960 | Smoll | 342/39 |
| 3,122,737 | A | * | 2/1964 | Setrin | 342/39 |
| 4,454,510 | A | | 6/1984 | Crow | 343/5 GC |
| 4,899,156 | A | | 2/1990 | Litchford et al. | 342/37 |
| 5,302,953 | A | * | 4/1994 | Pierre et al. | 342/37 |
| 5,570,095 | A | | 10/1996 | Drouilhet, Jr. et al. | 342/357 |
| 5,835,059 | A | | 11/1998 | Nadel et al. | 342/398 |
| 5,920,277 | A | * | 7/1999 | Foster et al. | 342/32 |
| 6,448,929 | B1 | * | 9/2002 | Smith et al. | 342/456 |
| 6,587,069 | B2 | * | 7/2003 | Ringwald et al. | 342/30 |

FOREIGN PATENT DOCUMENTS

| | | | |
|---|---|---|---|
| DE | 197 57 042 | 6/1999 | G01S/1/16 |
| DE | 19757042 A1 * | 6/1999 | G01S/1/16 |
| WO | WO 95/03213 | 2/1995 | B64C/37/02 |
| WO | WO 00/41153 | 7/2000 | G08G/5/02 |
| WO | WO 01/86319 | 11/2001 | G01S/13/00 |

OTHER PUBLICATIONS

"Surveillance monitoring of parallel precision approaches in a free flight environment," Evers, C.; Hicok, D.; Wong, G.; Digital Avionics Systems Conference, 1997. 16th DASC., AIAA/IEEE, vol.: 2 , Oct. 26–30, 1997, Page(s): 9.4–1–9.4–8 vol. 2.*

ALLSTAR Network, "Traffic Alert/Collision Avoidance System (TCAS)," http://www.allstar.fiu.edu/aero.TCAS.htm, (Internet, 2003).

(List continued on next page.)

*Primary Examiner*—Bernarr E. Gregory
*Assistant Examiner*—Brian K Andrea
(74) *Attorney, Agent, or Firm*—Testa, Hurwitz & Thibeault

(57) ABSTRACT

A system and method for measuring and predicting information on the position of approaching aircraft are disclosed. The system features a processor, an interrogating antenna, a receiving antenna, and a data link. The processor schedules interrogations and suppression pulses. Both of the antennas and the data link are in signal communication with the processor. The interrogating antenna transmits interrogations to a plurality of approaching aircraft. At least some of the interrogations include suppression pulses. The receiving antenna comprises at least three fixed, broad azimuth, array elements. The receiving antenna receives replies from each of the plurality of approaching aircraft and communicates the replies to the processor. The processor determines a state for each of the plurality of approaching aircraft based on the replies. The data link communicates information on the state of each of the plurality of approaching aircraft from the processor.

20 Claims, 3 Drawing Sheets

OTHER PUBLICATIONS

Harman et al., "Active BCAS: Design and Validation of the Surveillance Subsystem," *Lincoln Laboratory Project Report ATC–103*, Report No. FAA–RD–80–134 (Dec. 1980).

PCT International Search Report for International Application No.: PCT/US03/27141.

Alcock et al., "Madge, A Microwave Aircraft Digital Guidance Equipment. I. General Prinicples and Angle–Measuring Units," *Philips Technical Review*, vol. 34, No. 9, pp. 225–241 (1974).

Alcock et al., "Performance of the MADGE Aircraft Guidance System," *European Microwave Conference Proceedings*, pp. 313–317 (Microwave Exhibitions and Publishers, Sep. 1975).

Corbett, "Madge, A Microwave Aircraft Digital Guidance Equipment. II. The Data Link: Data Transmission And Distance Measurement," *Phillips Technical Review*, vol. 35, No. 10, pp. 271–289 (1975).

Gopalapillai, et al., "Feasibility of Satellite Interferometry for Surveillance, Navigation, and Traffic Control," *National Aeronautics and Space Administration Task Final Report No. BCL–OA–TFR–76–2*, (Feb. 1976).

Gopalapillai et al., "Satellite Interferometer as an Advanced Navigation/Communication System," *Navigation: Journal of The Institute of Navigation*, vol. 25, No. 4, pp. 405–418 (Winter 1978–1979).

Gordon, "Monopulse Technique Applied to Secondary Surveillance Radar," *GEC Journal of Science & Technology*, vol. 47, No. 3, pp. 127–134 (United Kingdom, 1981).

Harman, "TCAS: A System for Preventing Midair Collisions," *The Lincoln Laboratory Journal*, vol. 2, No. 3, pp. 437–458 (1989).

ITT Gilfillan Inc., "Regal Test Program Support," *Final Report Federal Aviation Agency* (Apr. 1964).

Kaminsky et al., "ATCRBS Reply Environment at Memphis International Airport," *Lincoln Laboratory Project Report ATC–198*, Report No. DOT/FAA/NR–93/3 (May 1993).

LaFrey, "Parallel Runway Monitor," *The Lincoln Laboratory Journal*, vol. 2, No. 3, pp. 411–436 (1989).

Lambell et al., "PAIR–Precision Approach Interferometer Radar," *Philips Telecommunication Review*, vol. 35, No. 2, pp. 57–69 (Jun. 1977).

Lind, "Two Simulation Studies of Precision Runway Monitoring of Independent Approaches to Closely Spaced Parallel Runways," *Lincoln Laboratory Project Report ATC–198*, Report No. DOT/FAA/NR–92/9 (Mar. 1993).

McAulay, "Interferometer Design for Elevation Angle Estimation," *IEEE Transactions on Aerospace and Electronic Systems*, vol. AES–13, No. 5, pp. 486–503 (Sep. 1977).

McAulay, "Optimum Elevation Angle Estimation in the Presence of Ground Reflection Multipath," *Lincoln Laboratory Technical Note 1976–11* (Defense Technical Information Center, Feb. 1976).

Owen, "The Memphis Precision Runway Monitor Program Instrument Landing System Final Approach Study," *Lincoln Laboratory Project Report ATC–198*, Report No. DOT/FAA–NR–92/11 (May 1993).

Owen, "A Pulsed Interferometer System for Air Terminal Approach," *Symposium on Electronics for Air Traffic Control* (Electronic Engineering Association, United Kingdom, 1969).

Plotka, "Test and Evalutation of a Fesibility Model ILS Glide Slope Performance Assurance Monitor for the Final Approach Path, " *Federal Aviation Administration Final Report No. FAA–RD–76–176* (Defense Technical Information Center, Dec. 1976).

Pogust, "Microwave Landing Systems," *Revista Telegrafica Electronica*, vol. 66, No. 787, pp. 637–642 (Aug. 1979) [English Abstract].

Precision Runway Monitor Program Office, "Precision Runway Monitor Demonstration Report," *Federal Aviation Administration Final Report No. DOT/FAA/RD–91/5* (Defense Technical Information Center, Feb. 1991).

Ritter, "Test and Evaluation of a Feasibility Model for ILS Performance Assurance on Final Approach, Touchdown, and Rollout," *Federal Aviation Agency Report No. FAA–RD–74–66*, (Defense Technical Information Center, Apr. 1974).

Thoma et al., "A Hybrid Navigation Concept Using a Spinning Satellite–Borne Interferometer and Self–Contained Equipment," *IEEE Transaction on Aerospace and Electronic Systems*, vol. AES 8, No. 4, pp. 528–537 (Jul. 1972).

Watanabe et al., "A Japanese 3–D Radar for Air Traffic Control," *Electronics*, vol. 44, No. 13, pp. 68–72 (Jun. 1971).

* cited by examiner

SURVEILLANCE SYSTEM AND METHOD FOR AIRCRAFT APPROACH AND LANDING

GOVERNMENT SUPPORT

This invention was made with government support under Contract Number F 19628-00-C-0002, awarded by the Air Force. The government has certain rights in the invention.

TECHNICAL FIELD

This invention relates to a surveillance system and method for aircraft approach and landing and, more particularly, a system and method that is well-suited for use on parallel runways under instrument meteorological conditions.

BACKGROUND INFORMATION

Various surveillance systems and methods have developed over the course of military and civilian aviation in the United States. Each new system and method generally builds on the existing technology and is compatible with the existing technology.

In the 1980s, the Federal Aviation Administration (FAA) recognized that parallel approaches to runways spaced less than 4,300 feet apart are restricted under instrument meteorological conditions (IMC) because of limitations in the current radars and displays. The limitations required air traffic controllers to use dependently sequenced approaches, so that if an aircraft blunders toward the adjacent approach, it would pass through a gap and not into another aircraft. Accordingly, the FAA instituted several initiatives to study various technologies to reduce the restrictions on parallel approaches and to develop a system and method that would improve the capacity of airports with parallel runways. Some of the results of the initiatives are summarized in R. LaFrey's "Parallel Runway Monitor," 2 *The Lincoln Laboratory Journal* (Fall 1989), pp. 411–36, which is hereby incorporated by reference.

It was clear from the studies that the Parallel Runway Monitor (PRM), which the system and method to improve the capacity of airports with parallel runways was dubbed, required an increase in the surveillance update rate. The FAA developed two ways to increase the surveillance update rate. One was to put two Mode S antennas, facing in opposite directions, on the same rotating structure. The two-antenna approach resulted in a satisfactory update rate. The other approach was to use a circular array of many radiating elements, which could be individually excited in phase and amplitude to create a fan beam that could be pointed in any direction very quickly. The azimuth measurement in the circular array approach is a form of a monopulse. The update rate could be as high as desired, and in practice was set at once per second. The FAA selected the circular array method for monitoring closely spaced parallel approaches.

As more parallel runways are planned and small airports become more popular, there is incentive to reassess the PRM. Some elements of the PRM, such as the circular array antenna and its control system, are complicated and expensive. Other elements of the PRM, such as the processor, may not take full advantage of current computer processing capabilities. Airports may want to maximize the use of parallel runways that are more closely spaced than the PRM was designed to handle, and may therefore need an alternative to the PRM.

SUMMARY OF THE INVENTION

An objective of the present invention to provide information to an air traffic control system that will enable safe, independent aircraft arrivals at closely spaced parallel runways under instrument meteorological conditions. Another objective of the present invention is to provide such information without requiring modification to existing aircraft transponders.

In general, in one aspect, the invention is directed to a system for measuring and predicting information on the position of approaching aircraft. The system features a processor, an interrogating antenna, a receiving antenna, and a data link. The processor schedules interrogations and suppression pulses. Both of the antennas and the data link are in signal communication with the processor. The interrogating antenna transmits interrogations to a plurality of approaching aircraft. At least some of the interrogations include suppression pulses. The receiving antenna comprises at least three fixed, broad azimuth, array elements. The receiving antenna receives replies from each of the plurality of approaching aircraft and communicates the replies to the processor. The processor determines a state for each of the plurality of approaching aircraft based on the replies. The data link communicates information on the state of each of the plurality of approaching aircraft from the processor.

In another aspect, the invention is directed to a method of measuring and predicting information on the position of approaching aircraft. The method includes receiving surveillance data on a plurality of aircraft within a first volume, and filtering the data to identify a target list of aircraft. The target list of aircraft is determined by location within a volume at least partially defined by characteristics of a receiving antenna comprising at least three fixed, broad azimuth, array elements. The method also includes scheduling interrogations for the target list of aircraft, and storing the schedule of interrogations. The method further includes transmitting interrogations, at least some of the interrogations including suppression pulses, and receiving replies to the interrogations from each aircraft on the target list of aircraft. Finally, the method includes determining the state of each aircraft on the target list of aircraft based on the replies and the schedule of interrogations.

In another aspect, the invention is directed to a system for collecting and calculating information on the position of a plurality of approaching aircraft. The system features a memory buffer, a processor, and an output device. The memory buffer stores surveillance data on a plurality of aircraft within a first volume. The processor, which is in signal communication with the memory buffer and the output device, runs a plurality of modules. The modules include a filtering module, a scheduling module, and a tracking module. The filtering module identifies a target list of aircraft within a zone of interest from the surveillance data. The zone of interest is at least partially defined by characteristics of a receiving antenna comprising at least three fixed, broad azimuth, array elements. The scheduling module schedules interrogations based on the target list. At least some of the interrogations include suppression pulses. The tracking module calculates state information based on replies to interrogations from each of the plurality of aircraft on the target list. The output device communicates state information for each of the plurality of aircraft on the target list.

Embodiments of the foregoing aspects of the invention include the following features. The plurality of approaching aircraft, which may be on the target list, may be identified from surveillance data on the plurality of aircraft within a first volume from a nearby secondary radar, from flight plan information, from S-Mode squitters, from Mode S and Mode A/C interrogations, or from a combination of the foregoing. A suppression antenna may transmit P2 suppression pulses to the plurality of approaching aircraft. Replies may include transmissions from the plurality of approaching aircraft sent in response to the interrogations, Mode-S squitters, or both.

In some embodiments, calculating state information for each of the plurality of aircraft on the target list may include determining the azimuth of each aircraft based on the replies and the schedule of interrogations. Ambiguity in determining the azimuth of an aircraft on the target list of aircraft may be resolved using surveillance data from the nearby secondary radar. One or more pulses within a reply sent in response to an interrogation may suffice, in some embodiments, to determine the state of the responding aircraft; receiving the entirety of a standard reply to an interrogation may not be necessary to determine the state of the responding aircraft.

In some embodiments, the schedule of interrogations may be modified in response to a failure to receive a reply. For example, an interrogation including suppression pulses may be re-scheduled and re-transmitted if no reply to the original interrogation is detected. Interrogation characteristics, in some embodiments, may be modified based on the characteristics of replies received in response to one or more previous interrogations.

The foregoing and other aspects, features, and advantages of the invention will be apparent from the following description.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DESCRIPTION

Figure 1:
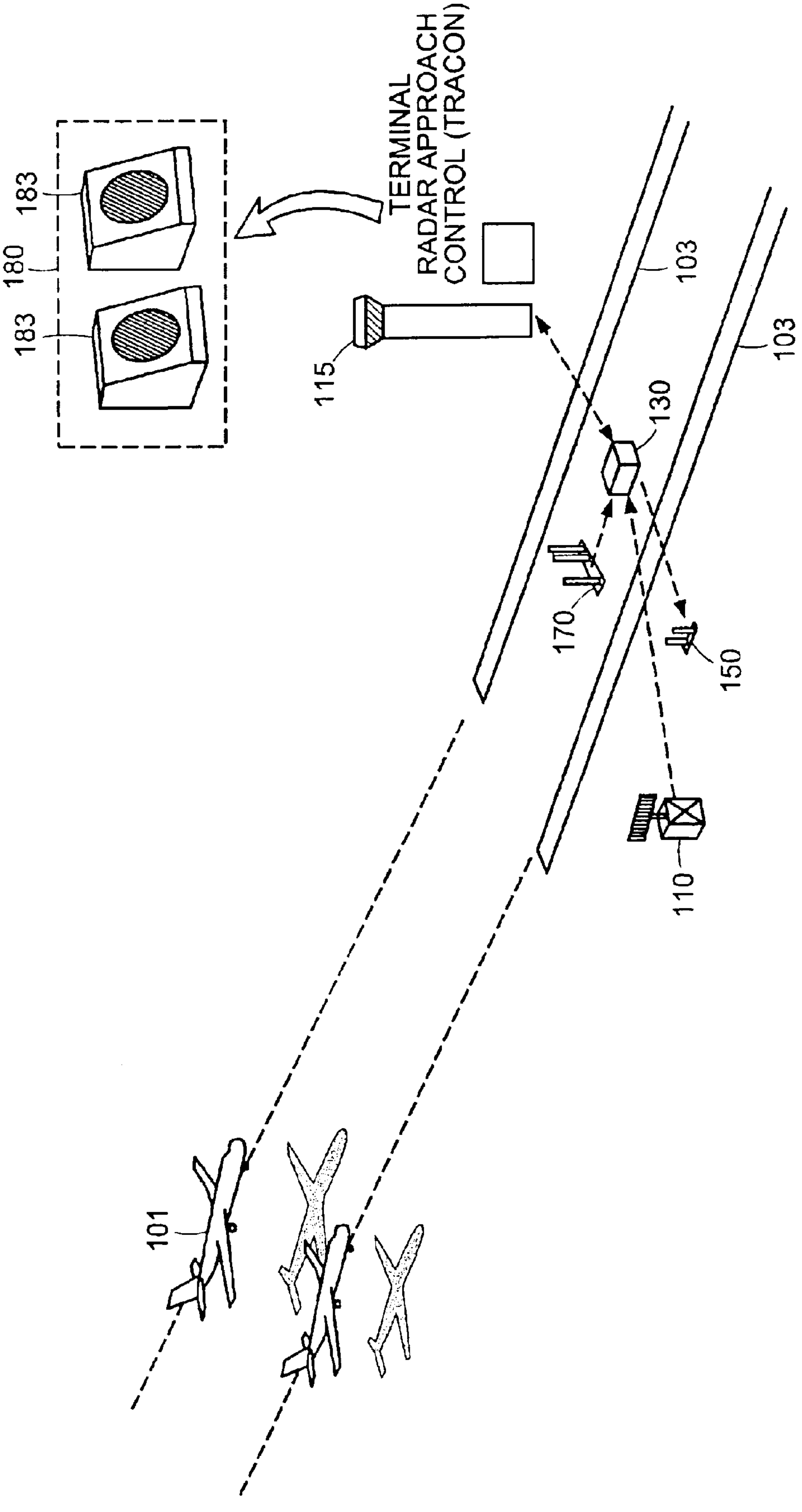
FIG. 1 is a perspective view of elements of one embodiment of the invention and its relationship with existing air traffic control equipment in an airport with parallel runways.

FIG. 1 is a perspective view of elements of one embodiment of the invention and its relationship with prior art air traffic control equipment in an airport with parallel runways. Prior to incorporation of an embodiment of the invention, the airport shown in FIG. 1 featured two parallel runways 103, an airport surveillance sensor (ATCBI-6, Mode S, etc.) 110 for generating surveillance data, a control tower 115, a flight data connection (for example with the FAA, not shown), and the appropriate data lines. The embodiment of the present invention depicted in FIG. 1 uses the following additional elements: an interrogating antenna 150; a receiving antenna 170 having at least three fixed, broad azimuth, array elements; a processor 130; and a display system 180.

The interrogating antenna 150 is designed to transmit Mode-S and Mode A/C interrogations. The interrogations include a plurality of pulses including interrogation pulses and S1 suppression pulses. The interrogating antenna 150, in some embodiments, is an antenna array and, in other embodiments, is a feed horn. The interrogating antenna 150, in some embodiments, transmits interrogations in a rotating beam, which is narrow in azimuth and broad in elevation (a fan beam), like the ATCBI-6 beacon interrogator. In some such embodiments, the rotation of the beam is limited to the zone of interest. In one such embodiment, the zone of interest is a wedge of approximately 70 degrees encompassing the parallel runways of the airport and the final approach thereto.

Energy, from the interrogating antenna 150, that strikes the ground combines with the energy emitted upward to form vertical lobes and nulls in the net radiated pattern. Embodiments using an interrogating antenna 150 similar to ATCRBS may additionally include a separate suppression antenna. The suppression antenna in these embodiments is capable of transmitting P2 suppression pulses and is capable of sidelobe suppression.

The receiving antenna 170 has standard, fixed beacon antenna array elements. In one embodiment, the receiving antenna 170 is approximately five feet tall and twenty-five feet wide. The antenna has at least three array elements. The first array element is the reference antenna (shown as 273, with respect to the receiving antenna 270 in FIG. 2). The second array element is the low-resolution array element (shown as 275, with respect to the receiving antenna 270 in FIG. 2). The third array element is the high-resolution array element (shown as 277, with respect to the receiving antenna 270 in FIG. 2). In embodiments of invention, the array elements form a line transverse to the direction of the parallel runways. The line formed by the array elements in one such embodiment is perpendicular to the direction of the parallel runways. More than three array elements are used in other embodiments. In the embodiment depicted in FIG. 1, a data link allows signals received from each of the array elements to be communicated to the processor 130. The receiving antenna 170 detects Mode S and ATCRBS pulse sequences that constitute aircraft transponder replies.

The processor 130 in some embodiments of the invention enables Monopulse Secondary Surveillance Radar (MSSR) and Traffic Alert and Collision Avoidance System (TCAS) technology to be used with a simple azimuth antenna. In such embodiments, the processor 130 is in signal communication with a memory buffer with contains a continuous stream of surveillance data from the MSSR on all aircraft within its surveillance volume. The surveillance volume of an airport may be partly defined by a circle extending in an azimuthal radius 60 nautical miles from the center of the airport. Such surveillance data includes the Mode S identity, as well as range and azimuth data for the aircraft. The surveillance data is filtered by a filtering module running on the processor to identify a target list of aircraft within a zone of interest. In embodiments that receive a continuous stream of surveillance data from the MSSR, there is no need to independently identify the initial position and identity of Mode S aircraft within the zone of interest.

In other embodiments, the processor 130 receives flight plan information from a data link to identify the initial position and identity of aircraft within the zone of interest. Pilots of aircraft that fly under Visual Flight Rules file flight plans—including departure and arrival times, intended route, the ATCRBS transponder code, and other information—(in the U.S., with the FAA) prior to departure. These flight plans are forwarded to controllers via data lines. Embodiments of the invention that use flight plan information to identify aircraft within the zone of interest do not rely on any standard aircraft radar systems. Instead, the flight plan information may be used to relate transponder codes with the aircraft identification or flight number. The filtering module in such embodiments filters flight plan information to identify the target list of aircraft within the zone of interest.

In embodiments in which the processor 130 receives initial information regarding aircraft in the zone of interest from MSSR surveillance data or flight plan information, there is no need for the invention to independently acquire the Mode S identities of aircraft within the zone of interest. Nonetheless, some embodiments of the invention include a separate TCAS unit to acquire Mode S addresses within the zone of interest. This acquisition is accomplished using Mode S surveillance algorithms and a separate DME antenna to achieve a larger range. In one such embodiment, the range of the surveillance exceeds 30 nautical miles. The TCAS unit in some such embodiments is not configured to perform Mode A/C surveillance. The TCAS unit in other such embodiments is configured to perform Mode A/C surveillance. Embodiments featuring Mode S acquisition may be particularly useful if the MSSR fails during simultaneous parallel instrument approaches.

Figure 3:
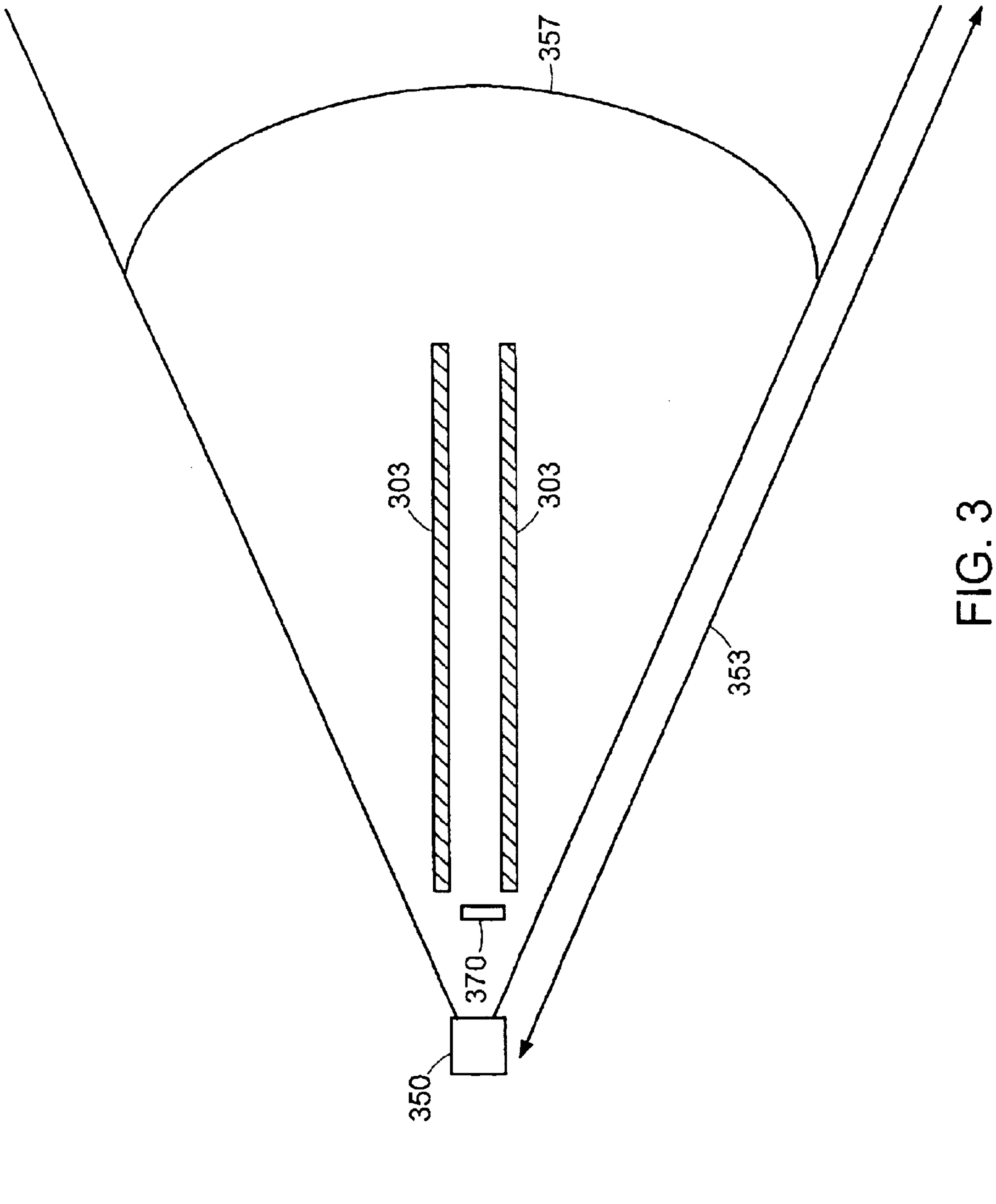
FIG. 3 is a schematic representation of the zone of interest and its relationship to the parallel runways, the interrogating antenna, and the receiving antenna in one embodiment of the invention.

FIG. 3 depicts an aerial view of an exemplary zone of interest according to one embodiment of the invention. The zone encompasses the parallel airport runways 303, as well as the final approach to those runways. The zone is defined by an azimuth angle wedge with the interrogating antenna 350 at its origin. The arc defined by the wedge 357 is approximately 70 degrees. The sides of the azimuth angle wedge extend a distance 353 from the interrogating antenna 350. The distance 353 is defined by the placement and characteristics of the receiving antenna 370, as well as the broadcast range of the interrogating antenna 350. In one such embodiment, the distance 353 is approximately 35 nautical miles from interrogating antenna 350. In the embodiment depicted in FIG. 3, the receiving antenna 370 is within the zone of interest. In other embodiments of the invention, the receiving antenna 370 may be outside the zone of interest. For example, the receiving antenna 370 in an alternative embodiment of FIG. 3 is to the left of the interrogating antenna 350.

The processor 130, in particular the scheduling module in specific embodiments, improves upon the prior art Mode S and TCAS whisper/shout technology on the ground side of an air traffic control system. Embodiments of the present invention are capable of providing 1 milli-radian RMS azimuthal accuracy and 50 feet RMS range accuracy. Some embodiments for use in airports with a 3000-3400 foot runway separation have an update interval of 1.0 second. The 1.0 second update interval was deemed satisfactory by the FAA during PRM development based on an assumed target load of up to 50 Mode S aircraft and 25 Mode A/C aircraft in the zone of interest. Some embodiments for use in airports with a 3400-4300 foot runway separation have an update interval of 2.4 seconds. Some embodiments may use an update interval that is higher than necessary based on the relevant runway separation distance.

As one of ordinary skill knows, a Mode S transponder will only reply to an interrogation that contains that particular transponder's own unique 24 bit address. Accordingly, it is necessary for the processor 130, in particular the scheduling module in specific embodiments, to have the transponder address and approximate position and in order to effectively track Mode S-equipped aircraft. With the exception of the standard interrogation repetition frequency (about 1 Hz), Mode S is accurate enough for monitoring independent parallel runway approaches. The processor 130, in particular the scheduling module in specific embodiments, may achieve an acceptable Mode S interrogation repetition frequency by simply limiting the azimuth range of interrogations to the zone of interest while maintaining the surveillance rate. Mode S interrogations are timed so that replies will not overlap in time.

The processor 130, in particular the scheduling module in specific embodiments, schedules Mode A and C interrogations for transmission by the interrogating antenna 150 based on an adaptation of the 32 step, 1 dB per step, TCAS Whisper-Shout (W/S) sequence similar to that in the TCAS Minimum Operational Performance Specification (MOPS). In one embodiment, four Mode A W/S sequences and four Mode C W/S sequences are sent each second to provide reliable altitude, identity and surveillance data. The use of W/S sequences minimizes the synchronous garble, caused by multiple overlapping replies from aircraft within the zone of interest, received by the receiving antenna 170.

Although existing W/S technology relies on the repetition of an established schedule of interrogations, embodiments of the present invention includes a control loop that may vary the standard schedule of interrogations based on the replies received via the receiving antenna 170. For example, if no reply is detected from an aircraft of interest by the receiving antenna 170, the scheduling module may revise its standard schedule to re-transmit the corresponding interrogation or a subset of the interrogations within the standard schedule. The processor 130, and in particular the scheduling module in specific embodiments, will allow the time it takes an interrogation to reach the target aircraft plus the time it takes for the reply to travel back to the receiving antenna 170 plus some margin for error before concluding that no reply to a particular interrogation has been received. Adapting a standard schedule based on information regarding the actual response to the scheduled interrogations may result in more efficient surveillance.

Although the characteristics of interrogations by existing W/S technology are fixed, embodiments of the present invention match the characteristics of interrogation to the characteristics of replies received via the receiving antenna 170. For example, although an aircraft 101 may have a transponder with an omni-directional transmission pattern, the shape of the fuselage, wings, landing gear, and other aircraft features will cause a reply from that particular aircraft to have a distinct pattern with lobes and nulls in azimuth and elevation. Once a reply with specific reply characteristics is received and associated with a particular aircraft 101, these characteristics can be taken into account when selecting interrogation characteristics. Varying interrogation characteristics to match particular reply characteristics may result in more efficient surveillance.

The processor 130 in various embodiments saves the schedule of interrogations in a memory buffer for later use in determining the state of each of the aircraft in the zone of interest.

The processor 130, in particular the tracking module in some embodiments, processes Mode S replies received by the receiving antenna 170 with Mode S ground sensor algorithms to verify the Mode S identifications, the estimated range, altitude and azimuth, and to create target reports. Similarly, Mode A and C replies are processed in reply algorithms adapted from the MSSR mode of the Mode S sensor. Based on the acquisition information and the interrogation schedule, each Mode A and C reply will have an precision azimuth estimate associated with it so it may be processed using the techniques developed for the Mode S sensor operating with a narrow antenna scanning pattern. The algorithms are used to create target reports.

In particular, range is calculated from the elapsed time between the emission of an interrogation and the reception of the corresponding reply. Azimuth is measured by interferometry on the replies. The azimuth interferometer uses each of the receiving antenna arrays. The difference in the phase of the signals received from the various array elements is used to determine the azimuth of the aircraft sending the signal. In some embodiments, the azimuth is calculated by a separate azimuth processor. In other embodiments, the azimuth is calculated by the tracking module running on the primary processor 130 of the invention. The interferometry azimuth may be ambiguous. For example, if the interferometer indicates 4 degrees, the azimuth may actually be 4 degrees plus multiples of 7 degrees. In some embodiments, the tracking module or azimuth processor uses the MSSR surveillance data to resolve any ambiguity.

Although existing technology bases surveillance on the detection of complete replies, embodiments of the present invention will create a target report even when a complete reply from the aircraft is not received. For example, even though the other pulses may not be detected, embodiments of the present invention create a target report from a fragment of a reply as small as a single pulse of the reply.

The processor 130, in particular the tracking module in some embodiments, associates the resulting target reports with past tracks based on the information contained therein. A track includes the aircraft identity, range, azimuth, altitude and derivatives of the latter three (together the track "state"). The target reports are "correlated" with predicted track positions. A target report that matches a track is used to update the track state. Target reports from a particular set of interrogations that do not correlate with any existing track are compared with uncorrelated reports from previous sets of interrogations. Any matches are used to start new tracks. The processor, in some embodiments, also performs tests to eliminate false target reports created by reflections. Finally, the processor communicates the revised state information to an output device. In some embodiments, the output device is in signal communication with a display system 180 and the state information is formatted appropriately for use by that particular display system 180.

The display system 180, in some embodiments, is the same system used with the PRM. The output of the invention in these embodiments is data in a format needed for existing FAA final monitor displays 183 and maintenance monitoring facilities. The processor 130 depicted in FIG. 1 is in signal communication with the display system 180 to provide accurate, fast state information for display. The display 183 incorporates graphics and provisions for format modifications by controllers. The graphics feature a map identifying approaching corridor boundaries, and, in some embodiments, important navigational features to ensure consistency with other air traffic displays. The display system 180 includes algorithms that estimate future aircraft locations, and provide a caution alert if an aircraft appears to be heading toward the no-travel-zone (NTZ) and a warning alert when the aircraft actually penetrates the zone. In one embodiment, aircraft locations are shown with a graphical symbol along with a leader line connecting the aircraft to block of related information. In some embodiments, each display 183 is designed to be monitored by an individual controller. In some embodiments, such as depicted in FIG. 1, there is one display device 183 per parallel runway 103.

Figure 2:
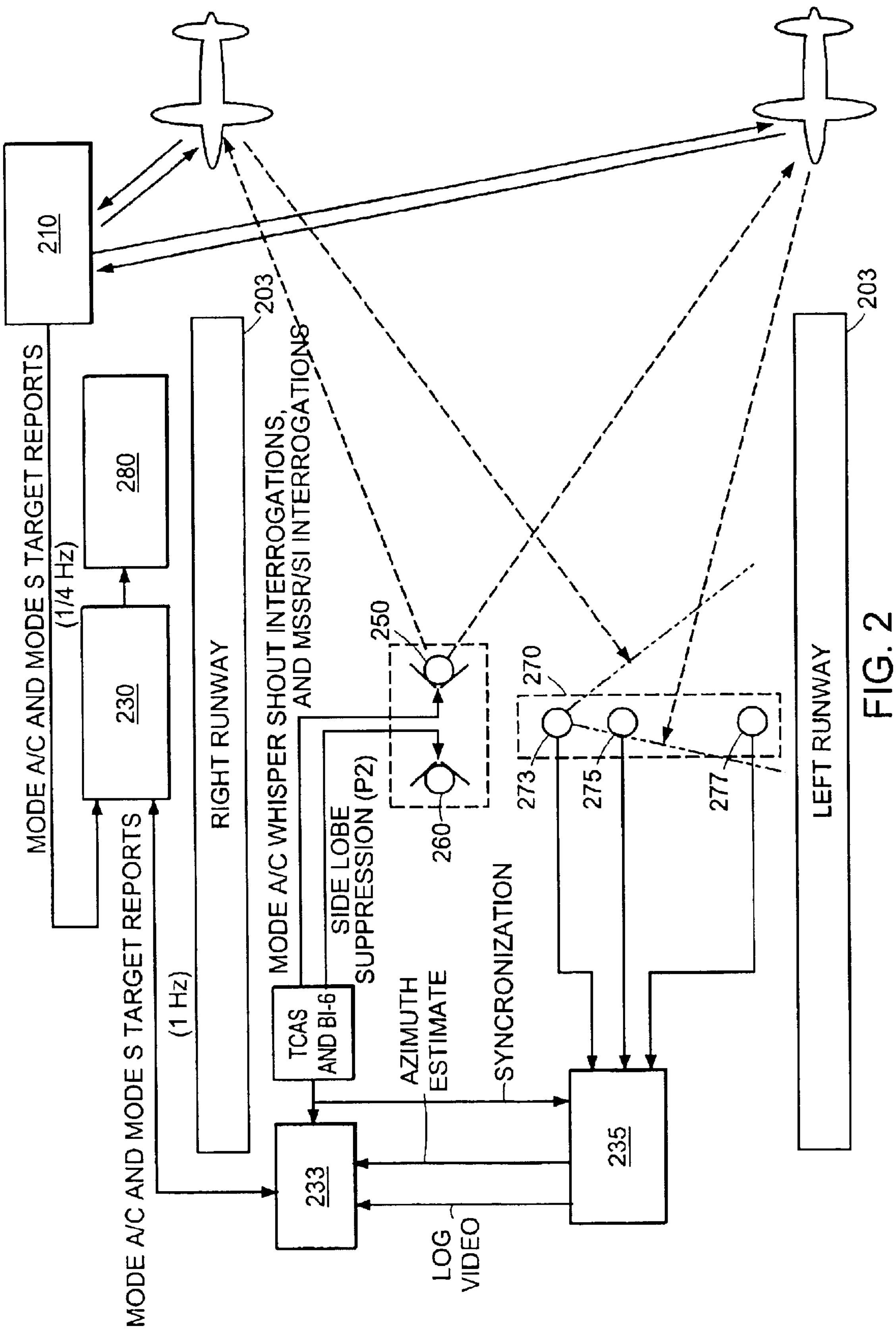
FIG. 2 is a block diagram of elements of an embodiment of the invention and its relationship with existing air traffic control equipment in an airport with parallel runways.

The operation of an embodiment of the present invention to maximize use of two or more parallel runways and to prevent aircraft that are landing on the runways from colliding is described with reference to FIG. 2. In the context of this description, a parallel runway is a runway that is oriented in approximately the same direction as another runway at the same airport. Although FIG. 2 depicts two parallel runways 203, the invention can be used with any number of parallel runways. In the embodiment depicted in FIG. 2, the existing MSSR 210 communicates target reports on both Mode A/C and Mode S aircraft within the airport's surveillance volume to a memory buffer in signal communication with the processor 230. The processor 230, specifically the filtering module running on the processor 230 in some embodiments, generates a target list of aircraft within the zone of interest (an example of which is depicted FIG. 3) based on the target reports for aircraft within the airport's surveillance volume. Embodiments that identify aircraft within the zone of interest directly from Mode S and Mode A/C interrogations need not incorporate a filtering module or equivalent processor. The processor 230, specifically the scheduling module running on the processor 230 in some embodiments, schedules interrogations for the aircraft on the target list. At least some of the interrogations include suppression pulses. The processor 230 communicates the schedule of interrogations to the interrogating antenna 250 and a memory buffer for later use.

The interrogating antenna 250 transmits interrogations in a fan beam to the plurality of approaching aircraft within the zone of interest according to the schedule of interrogations from the processor 230. A suppression antenna 260 is also used in the embodiment of the invention depicted in FIG. 2 for side lobe suppression. Each aircraft in the zone of interest receiving an interrogation, which its transponder was designed to respond to, will emit a reply. The reply may have specific characteristics due to the shape of the fuselage, wings, landing gear, and other aircraft features. The reply may also be incomplete for a variety of reasons. The reply is received by each of the array elements 273, 275, 277 of the receiving antenna 270 and communicated to the azimuth processor 235, among others. An alternative embodiment of the invention uses a single processor 230 running a plurality of software modules to perform the function of the various processors 230, 233, 235 depicted in FIG. 2.

The azimuth processor 235, or tracking module in an alternative embodiment, calculates an estimate of the azimuth of each responding aircraft using interferometry and communicates the estimate to the MSSR/SI processor 233. The MSSR/SI processor 233, or tracking module in an alternative embodiment, uses Mode S ground sensor algorithms to generate target reports from the Mode S replies. A precision azimuth estimate may be associated with each Mode A/C reply by correlating the reply with corresponding interrogation in the schedule of interrogations from the memory buffer. Accordingly, the MSSR/SI processor 233 also uses reply algorithms adapted from the MSSR to generate target reports from the Mode A/C replies. Reply fragments as short as a single pulse may be used to generate a target report. The MSSR/SI processor 233, or tracking module in an alternative embodiment, uses the MSSR surveillance data to resolve ambiguities in the azimuth estimate.

The processor 230, and in particular the tracking module in some embodiments, associates target reports with past tracks and updates state information for each aircraft in the zone of interest appropriately. The processor 230, and in particular the scheduling module in some embodiments, uses received replies, reply fragments, of missing replies as the basis for modifying the interrogation schedule. The processor 230 may, for example, modify the characteristics of an interrogation to match the characteristics of the reply of the target aircraft. The processor 230 may, for example, schedule the interrogation of a target aircraft to be re-transmitted if no reply is received. A memory buffer stores the final, in some cases modified, interrogation schedule for later use.

The processor 230 communicates current state information for each of the aircraft within the zone of interest to an output device. In FIG. 2, the output device is in signal communication with the PRM display 280 and the processor 230 communicates the state information in a format appropriate for that display 280. In embodiments such as depicted in FIG. 1, there is one display per parallel runway 203. Controllers monitor the displays while maintaining continuous radio contact with each aircraft. The display system 280 graphically shows the location of each aircraft within the zone of interest, along with related information. The display 280 cautions the controller when an aircraft appears to be heading for a NTZ, and warns the controller when the aircraft actually strays into a predetermined NTZ. The controller instructs such aircraft on how to either get back on course for landing or how to safely abort the landing. The rate at which aircraft state information is updated allows the controller and the pilots enough time to avoid a predictable blunder.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A ground system for measuring and predicting information on the position of approaching aircraft, comprising:

a ground-based processor for scheduling mode S and whisper-shout interrogations and suppression pulses;

a ground-based interrogating antenna in signal communication with the processor for transmitting interrogations to a plurality of approaching aircraft, a ground-based receiving antenna in signal communication with the processor for receiving replies from each of the plurality of approaching aircraft and communicating the replies to the processor, wherein the receiving antenna comprises at least three fixed, broad azimuth, array elements, wherein the processor calculates a state for each of the plurality of approaching aircraft based on the replies and the schedule of interrogations; and a data link in signal communication with the processor for communicating information on the state of each of the plurality of approaching aircraft from the processor.

2. The system of claim 1 wherein the replies comprise transmissions from the plurality of approaching aircraft sent in response to the interrogations.

3. The system of claim 2 wherein the replies further comprise Mode S squitters.

4. The system of claim 1 further comprising:

a suppression antenna in signal communication with the processor for transmitting P2 suppression pulses to the plurality of approaching aircraft.

5. A system for collecting and calculating information on the position of a plurality of approaching aircraft:

a memory buffer for storing surveillance data on a plurality of aircraft within a first volume;

a processor in signal communication with the memory buffer for running a plurality of modules, the plurality of modules comprising:

a filtering module for identifying a target list of aircraft within a zone of interest from the surveillance data, the zone of interest at least partially defined by characteristics of a receiving antenna comprising at least three fixed, broad azimuth, array elements;

a scheduling module for scheduling interrogations based on the target list, at least some of the interrogations including suppression pulses;

a tracking module for calculating state information based on replies to interrogations from each of a plurality of aircraft on the target list; and an output device in signal communication with the processor for communicating state information for each of the plurality of aircraft on the target list.

6. The system of claim 5 further comprising:

a first input device in signal communication with the memory buffer for receiving surveillance data on the plurality of aircraft within the first volume from a nearby secondary radar.

7. The system of claim 5 further comprising:

a second input device in signal communication with the processor for receiving replies to the interrogations.

8. The system of claim 5 wherein the tracking module calculates the azimuth of each aircraft based on the replies, the schedule of interrogations, and the surveillance data.

9. The system of claim 5 wherein the tracking module calculates the state of each aircraft on the target list of aircraft based on at least one pulse within each of the replies and the schedule of interrogations.

10. The system of claim 5 wherein the scheduling module re-schedules at least one of the interrogations including suppression pulses if a reply to the at least one of the interrogations is not detected.

11. The system of claim 5 wherein the scheduling module determines the characteristics of the interrogations containing suppression pulses based on the state of aircraft on the target list of aircraft.

12. A method of measuring and predicting information on the position of approaching aircraft, comprising:

receiving surveillance data on a plurality of aircraft within a first volume;

filtering the surveillance data to identify a target list of aircraft, the target list of aircraft determined by location within a volume at least partially defined by characteristics of a receiving antenna comprising at least three fixed, broad azimuth, array elements;

scheduling interrogations for the target list of aircraft;

storing the schedule of interrogations;

transmitting interrogations, at least some of the interrogations including suppression pulses;

receiving replies to the interrogations from each aircraft on the target list of aircraft; and determining the state of each aircraft on the target list of aircraft based on the replies and the schedule of interrogations.

13. The method of claim 12 further comprising:

receiving Mode S squitters; and adding to the target list of aircraft based on the Mode S squitters.

14. The method of claim 12 wherein the surveillance data is received from a nearby secondary radar.

15. The method of claim 12 wherein the determining step further comprises:

determining the azimuth of each aircraft based on the replies, the schedule of interrogations, and the surveillance data.

16. The method of claim 12 wherein the determining step comprises:

determining the state of each aircraft on the target list of aircraft based on at least one pulse within the replies and the schedule of interrogations.

17. The method of claim 12 further comprising:

transmitting at least one of the interrogations including suppression pulses again if a reply to the at least one of the interrogations is not detected.

18. The method of claim 12 wherein the scheduling step further comprises:

determining characteristics of the interrogations containing suppression pulses based on the state of aircraft on the target list of aircraft.

19. The ground system of claim 1 wherein the processor filters surveillance data to identify the plurality of approaching aircraft by location within a volume at least partially defined by characteristics of the receiving antenna.

20. The ground system of claim 1 wherein the processor adaptively reschedules interrogations when no corresponding reply is received from at least one of the plurality of approaching aircraft.

* * * * *